United States Patent [19]
Bozich

[11] 3,945,530
[45] Mar. 23, 1976

[54] ENCLOSURE FOR ELECTRICAL USE
[75] Inventor: Robert A. Bozich, Eveleth, Minn.
[73] Assignee: Malton Electric Company, Virginia, Minn.
[22] Filed: Sept. 12, 1974
[21] Appl. No.: 505,343

[52] U.S. Cl. ............ 220/329; 220/3.8; 220/73
[51] Int. Cl.² ........................................ B65D 43/06
[58] Field of Search ......... 220/3.8, 329, 242, 73–74; 174/52 R, 61

[56] References Cited
UNITED STATES PATENTS

| 828,144 | 8/1906 | Snigo | 220/74 |
|---|---|---|---|
| 1,481,415 | 1/1924 | Casper | 220/3.8 |
| 1,715,538 | 6/1929 | Dean | 220/3.8 |
| 1,934,220 | 11/1933 | Willson | 220/73 |
| 2,272,078 | 2/1942 | Zalkind | 220/73 |
| 2,352,667 | 7/1944 | Tofanelli | 220/74 |
| 2,489,245 | 11/1949 | Sola | 220/3.8 |
| 2,603,546 | 7/1952 | Lais | 220/3.8 |
| 2,656,948 | 10/1953 | McGee | 220/3.8 |
| 2,659,515 | 11/1953 | Miller | 220/73 |
| 3,112,839 | 12/1963 | Hallbauer | 220/3.8 |

Primary Examiner—William Price
Assistant Examiner—Ro E. Hart
Attorney, Agent, or Firm—Merchant, Gould, Smith, Edell Welter & Schmidt

[57] ABSTRACT

An improved enclosure for electrical use comprising a box having an open top and front, and a cover for closing both openings simultaneously. The front is bordered by lips turned inward from the sides, and near its lower end is provided with a pair of internal ramps sloping downwardly backward. The inside surface of the front portion of the cover, near its bottom, carries a rod whose ends extend into engagement with the ramps when the cover is placed on the box. The top and side edges of the cover are formed with resilient rims to engage the outer surfaces of the back and sides of the box, and are formed from the material of the cover itself by a multiple successive right angle bends in the same direction. Means are carried by the top and the back for preventing removal of the cover, and include apertured lugs for a padlock, a screw having a pentagonal drive recess, and means for preventing lateral access to the periphery of the screw. The enclosure is to be mounted by anchor bolts passing through lugs at its bottom.

8 Claims, 7 Drawing Figures

U.S. Patent   March 23, 1976   3,945,530
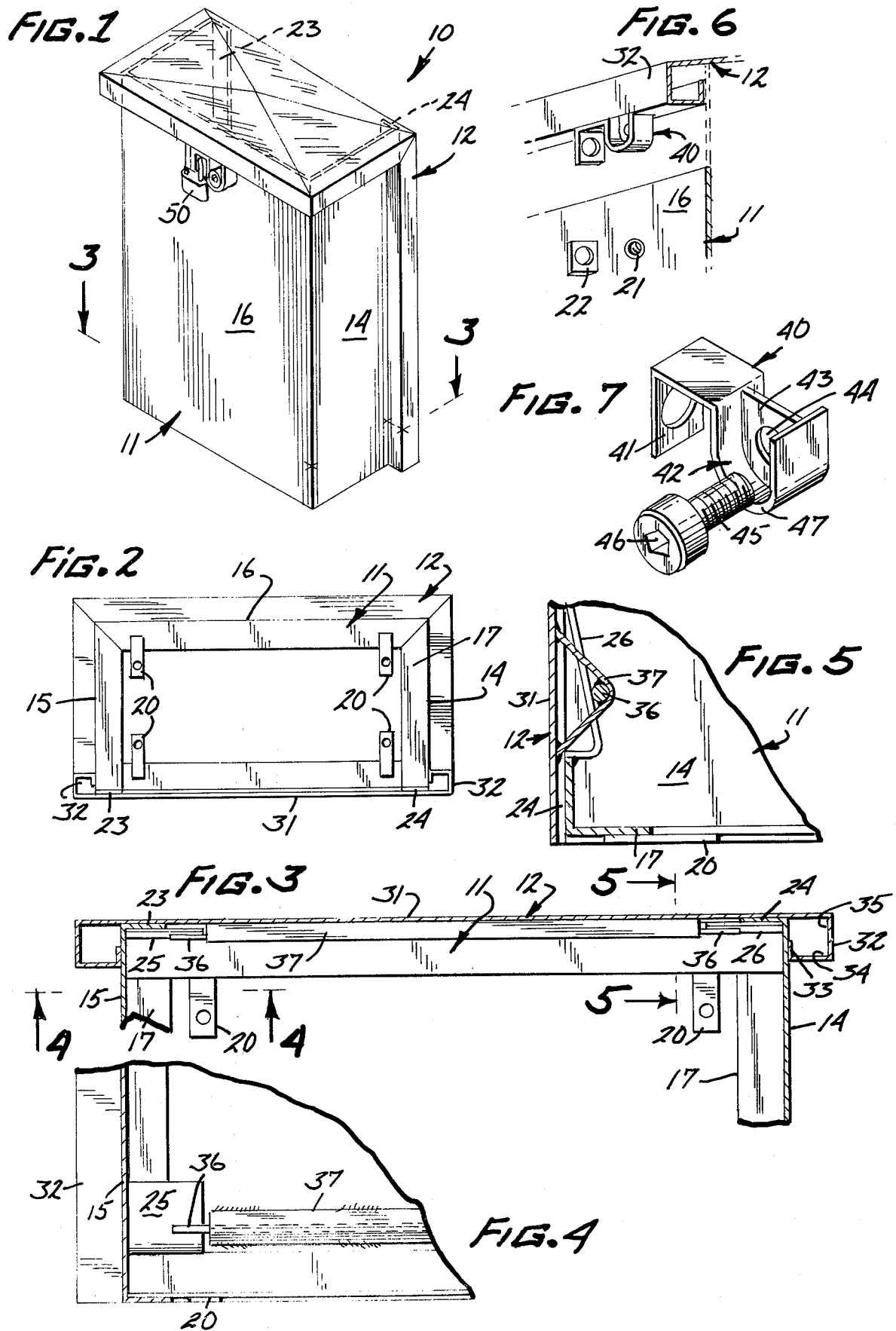

ENCLOSURE FOR ELECTRICAL USE

BACKGROUND OF THE INVENTION

This invention relates to enclosures for electrical use, and particularly to such enclosures for use in sectionalizing electrical systems. For this purpose an enclosure is desirable which gives maximum accessibility to its interior for use by the electricans in installing and connecting the sectionalizing components. Moreover, since such arrangements are not always located in sheltered, supervised areas it is desired that be resistant to the entrance of windborn particles such as snow or sand, and that access by unauthorized persons to the contents of the enclosure be made difficult, to discourage sabotage and vandalism.

SUMMARY OF THE INVENTION

My invention is embodied in a rectangular box with a cover completedly separable therefrom to maximize access to the interior. Means are provided for drawing the cover close to the box at the bottom of the front, and resilient means are provided for maintaining contact between the cover and the box around the top and down the sides. To accomplish these results the sides of the box are inturned at their front to provide lips which support internal ramps sloping downwardly backward, and the cover is provided with a rod adapted to engage the ramps: the cover is formed around its edges, by a succession of three inward right angle bends, to resiliently engage the box and thus prevent windblown dust and snow from gaining access. When the cover is on the box it may be locked thereto either by a padlock or by a screw passing through a lug in the cover and threadedly received in the back of the box: the lug is formed to prevent lateral access to the head of the screw, which also is cylindrical, and which has a shaped recess to enable it to be turned if the proper, non-conventional stub wrench is available.

It is accordingly a principal object of the invention to provide a new and improved enclosure for electrical use having greater accessibility for workmen, security against sabotage and vandalism, and protection against the weather that has heretofore been known. Another object is to provide such an enclosure in which a cover is integrally formed with resilient edges to engage a box and prevent the entrance of substantial windborn dust and snow. Another object is to provide such an enclosure with means for drawing a cover tightly toward a box when applied thereto. Another object is to provide such an enclosure which is made virtually tamper proof by the use of both a padlock and a locking bolt which cannot be removed by laterally applied tools, but only by a special axially inserted member. A more specific object is to provide an enclosure embodying all the special features just enumerated.

Various other objects, advantages, and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing

FIG. 1 is a perspective view of an enclosure according to my invention, seen from above and to the rear;

FIG. 2 is a bottom view of the enclosure;

FIG. 3 is a fragmentary section taken along the line 3—3 of FIG. 1;

FIG. 4 is a fragmentary section taken along the line 4—4 of FIG. 3;

FIG. 5 is a fragmentary section taken along the line 5—5 of FIG. 3;

FIG. 6 is a somewhat enlarged showing of how the principle components of the enclosure are assembled; and FIG. 7 is a further detail of structure shown in FIGS. 1 and 6.

DESCRIPTION OF THE PREFERRED EMBODIMENT

As shown in the drawing, my improved enclosure 10 comprises as major components a rectangular box 11 and a cover 12. Box 11 has an open top and front, sides 14 and 15, a back 16, and a bottom 17 with a central aperture of considerable size. Straps 20 are secured to bottom 17 for cooperating with conventional anchor bolts to fasten the box down securely. Near the center of its top edge, back 16 is provided with a tapped insert 21 and an apertured lug 22, for purposes presently to be explained. The sides of the box are inturned at the front to provide lips 23, 24 extending vertically along the side edges of the open front of the box. Near the bottom of the lips are a pair of internal ramps 25, 26 which slope downwardly backward at a steep angle.

Cover 12 comprises a top 30, which may be slightly ribbed for rigidity if desired, and a front 31. Along all of its edges except its bottom a resilient rim 32 is formed integral therewith by repeatedly folding the material inwardly at right angles, as suggested at 33, 34, 35 in FIG. 3. Near its bottom, front 31 carries a transverse rod 36 mounted in an angle 37 which is shorter than the distance between ramps 25 and 26, although the rod is longer than that distance.

Secured under the resilient rim at the back of the cover top is a locking member 40. As best shown in FIG. 7, member 40 has an apertured lug 41 and recess 42 crossed by a member 43 apertured at 44 to pass a bolt 45 threaded to engage in insert 21. The head of bolt 45 is cylindrical, and is formed with a pentagonal opening 46 to receive a stub wrench of like configuration. The wall 47 of the recess 42 is configured to fit closely against the head of the bolt and thus prevent application of any tool laterally thereto to loosen the bolt.

OPERATION

In use my box 11 is mounted by anchor bolts at its desired location, and the desired sectionalizing components are mounted therein and wired appropriately. To close the box the front of the cover is pressed against the front of the box at a point where rod 36 passes between lips 23 and 24. As the case is pushed against the box laterally the resilient rims grip the sides of the box. Now the cover is pushed downwardly as well as rearwardly: as it slides downward rod 36 engages ramps 25 and 26 and draws the bottom of the cover front tightly against the box. The resilient rim of the top engages the sides and back of the box as the cover is pressed home to substantially seal the opening. Bolt 45 is now passed through aperture 44 and threaded tightly into insert 21 using an appropriate wrench, and a padlock 50 is passed through lugs 22 and 41 to complete the security closure of the assembly.

From the above it will be evident that I have invented a new and useful electrical enclosure made up of two principal components which are entirely separable, but can be easily assembled to make a strong unit which is secure against tampering and resistant to the weather.

Numerous objects and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim as my invention:

1. In an enclosure for electrical use:
   a rectangular box comprising sides, a back, an open top, and an open front bordered by lips turned inwardly from at least said sides;
   a cover separable from said box and comprising mutually perpendicular top and front portions;
   a pair of internal ramps sloping downwardly backward near the bottoms of said lips;
   and a rod extending across the inner surface of said front portion of said cover near the bottom thereof for engaging said ramps to draw said cover against said box when said cover is moved downwardly against said box.

2. The structure of claim 1 together with means for securing said cover to said back to prevent removal of said cover.

3. The structure of claim 2 in which the securing means includes a bolt and means for preventing lateral access to the periphery of the head of said bolt.

4. The structure of claim 2 in which the securing means includes a female thread in said back, a bolt engaging said thread, a lip extending downward from said rim to pass said bolt, and means for preventing lateral access to the periphery of the head of said bolt.

5. In an enclosure for electrical use:
   a rectangular box comprising sides, a back, an open top, and an open front bordered by lips turned inwardly from at least said sides;
   a cover separable from said box and comprising mutually perpendicular top and front portions;
   a resilient rim formed around the top and side edges of said cover to engage the outer surfaces of said back and said sides, whereby to minimize entry of windborn sand or snow into said enclosure;
   and means securing said rim to said sides near the bottoms thereof.

6. The structure of claim 5 in which said resilient rim is formed from the material of said cover by three successive right angle bends in the same direction.

7. In an enclosure for electrical use:
   a rectangular box comprising sides, a back, an open top, and an open front bordered by lips turned inwardly from at least said sides;
   a cover separable from said box and comprising mutually perpendicular top and front portions;
   a pair of internal ramps sloping downwardly backward near the bottoms of said lips;
   a rod extending across and spaced from the inner surface of said front portion of said cover near the bottom thereof for engaging said ramps to draw said cover against said box when said cover is moved downwardly against said box;
   and a resilient rim formed around the top and side edges of said cover to engage the outer surfaces of said back and said sides, whereby to minimize entry of windborn sand or snow into said enclosure.

8. The structure of claim 7 in which said resilient rim is formed from the material of said cover by three successive right angle bends in the same direction.

* * * * *